United States Patent
Janovec et al.

[11] Patent Number: 5,930,040
[45] Date of Patent: Jul. 27, 1999

[54] PILLOWED FLEXIBLE CUBE-CORNER SHEETING AND METHODS OF MANUFACTURE

[75] Inventors: Jeffrey D. Janovec, River Falls, Wis.; Michael A. Essien, Woodbury, Minn.

[73] Assignee: 3M Innovative Properties Company, St. Paul, Minn.

[21] Appl. No.: 08/947,610

[22] Filed: Oct. 9, 1997

Related U.S. Application Data

[63] Continuation-in-part of application No. 08/631,856, Apr. 10, 1996, Pat. No. 5,805,338.

[51] Int. Cl.$^6$ .................................................. G02B 5/124
[52] U.S. Cl. ......................... 359/530; 359/900; 264/1.9; 264/2.7
[58] Field of Search ..................... 359/529–532, 359/513–514, 833, 834, 900; 156/60, 157, 160, 163, 164, 209, 196; 264/1.9, 2.7, 319, 320

[56] References Cited

U.S. PATENT DOCUMENTS

| | | |
|---|---|---|
| 3,684,348 | 8/1972 | Rowland . |
| 3,712,706 | 1/1973 | Stamm . |
| 3,992,080 | 11/1976 | Rowland . |
| 4,025,159 | 5/1977 | McGrath . |
| 4,202,600 | 5/1980 | Burke et al. . |
| 4,243,618 | 1/1981 | Van Arnam ................................. 264/1 |
| 4,406,045 | 9/1983 | Schwab .................................. 29/527.2 |
| 4,533,592 | 8/1985 | Bingham ................................. 428/213 |
| 4,555,161 | 11/1985 | Rowland . |
| 4,588,258 | 5/1986 | Hoopman . |
| 4,775,219 | 10/1988 | Appeldorn et al. . |
| 4,938,563 | 7/1990 | Nelson et al. . |
| 5,026,204 | 6/1991 | Kulp et al. ................................. 404/10 |
| 5,047,107 | 9/1991 | Keller et al. ............................. 156/184 |
| 5,189,553 | 2/1993 | Smith ....................................... 359/530 |
| 5,237,448 | 8/1993 | Spencer et al. ........................... 19/792 |
| 5,243,457 | 9/1993 | Spencer ................................... 119/795 |
| 5,300,783 | 4/1994 | Spencer et al. ....................... 250/462.1 |
| 5,315,491 | 5/1994 | Spencer et al. ........................... 362/84 |
| 5,450,235 | 9/1995 | Smith et al. ............................. 359/529 |
| 5,485,311 | 1/1996 | McAllister .............................. 359/530 |
| 5,601,911 | 2/1997 | Ochi et al. ............................ 428/304.4 |
| 5,632,946 | 5/1997 | Bacon, Jr. et al. ....................... 264/212 |
| 5,805,338 | 9/1998 | Janovec .................................. 359/529 |

FOREIGN PATENT DOCUMENTS

| | | | |
|---|---|---|---|
| 2 254 826 | 10/1992 | United Kingdom | ........... G02B 5/122 |
| WO 94/19711 | 9/1994 | WIPO | .............................. G02B 5/124 |

*Primary Examiner*—James Phan
*Attorney, Agent, or Firm*—Peter L. Olson

[57] ABSTRACT

A flexible, durable, cube-cornered retroreflective article capable of accommodating the expansion and contraction of the underlying polymeric substrate where such article has a pillowed or curved microstructured member bonded in a regular pattern to a sealing member. The retroreflective article has normal and stressed states. In the normal state, the microstructured member is substantially parallel with the sealing member. In the stressed state, the microstructured member is either compressed or elongated and the sealing member is substantially flat. The retroreflective article may be attached to traffic control devices, such as polymeric barrels, cones, or tubes to direct and guide motorists through road construction areas.

10 Claims, 2 Drawing Sheets

PILLOWED FLEXIBLE CUBE-CORNER SHEETING AND METHODS OF MANUFACTURE

RELATED APPLICATION

This application is a continuation-in-part of U.S. Ser. No. 08/631,856, filed Apr. 10, 1996, U.S. Pat. No. 5,805,338.

TECHNICAL FIELD

This invention relates to a retroreflective sheeting, and more particularly a pillowed flexible cube-corner sheeting that accommodates the expansion and contraction of traffic control devices such as polymeric barrels, cones, or tubes.

BACKGROUND

A retroreflective sheeting has the ability to redirect incident light towards its originating source. This ability has led to the widespread use of retroreflective sheetings on a variety of articles. Very often retroreflective sheetings are used on flat inflexible articles, such as road signs and barricades. However, situations frequently arise which require the sheetings to be used on irregular or flexible surfaces. For example, a retroreflective sheeting may be adhered to irregular surfaces of traffic control devices, such as polymeric barrels, cones, or tubes. These devices are used typically near roadway construction areas to direct and guide motorists. Also, a retroreflective sheeting may be adhered to a flexible substrate such as a road worker's safety vest. In situations where the underlying substrate is irregular or flexible, the retroreflective sheeting desirably possesses good conformability and flexibility without sacrificing retroreflective performance.

There may also be situations where the underlying substrate expands and contracts at a different rate than the retroreflective sheeting. For example, for a temperature decrease of 40° C. (92° F.), a traffic control device such as a low density polyethylene barrel would contract by about 0.80%, based on a coefficient of linear thermal expansion of $200 \times 10^{-6}$ (m/mK) at 20° C. For the same temperature change, a retroreflective sheeting with a polycarbonate layer would contract by only about 0.23%, based on a coefficient of linear thermal expansion of $57 \times 10^{-6}$ (m/mK) at 20° C. Thus, the barrel contracts almost 3.5 times more than the retroreflective sheeting. Because the retroreflective sheeting is wrapped outside of the barrel, conventional sheetings may wrinkle and lift off the barrel in response to the temperature change. In these situations, it is desirable for the retroreflective sheeting to accommodate the differences in thermal expansion and contraction without compromising retroreflectivity and without lifting off the substrate.

There are basically two types of retroreflective sheeting: beaded and cube-corner sheeting. Beaded sheeting uses a multitude of glass or ceramic microspheres to retroreflect incident light. Because the microspheres are separate from each other, they do not restrict the sheeting's flexibility. However, a cube-corner sheeting typically uses a multitude of rigid, interconnected, cube-corner elements to retroreflect incident light, as shown in U.S. Pat. No. 5,450,235 (Smith et al.). Although different types of flexible sheeting are disclosed, none addresses the need to account for the differences in the coefficient of linear thermal expansion between the substrate and the retroreflective sheeting.

One way to produce a stretchable, flexible retroreflective sheeting is disclosed in U.S. Pat. No. 3,992,080 (Rowland). That particular sheeting comprises two flexible, stretchable strips of polymeric material. The first strip is a transparent synthetic resin having a multiplicity of minute cube-corner formations on one surface. The second backing strip is of a lesser length than the first strip when both are in a relaxed condition. The backing strip is stretched a predetermined amount, typically 3% to 15%, before being bonded to the first strip of cube-corners. After the bonding process, the backing material is allowed to relax thereby forming a puckered cube-corner sheeting. In the relaxed state, the backing strip is in tension, while the cube-corner strip is in compression, to maintain the puckered appearance of the cube-corner strip. In applying this sheeting to a non-planar surface, such as a bicycle handlebar, the retroreflective sheeting must be stretched to a degree sufficient to eliminate the puckering. However, excessive stretching results in distortion of the cube-corner formations and cause a corresponding loss in retroreflectivity. This loss of retroreflectivity translates into a loss in brightness, causing the sheeting to be less effective as a safety device.

In view of the disadvantages of conventional retroreflective sheetings, it would be desirable to provide a sheeting that accommodates the different rates of expansion and contraction between the polymeric substrate and the sheeting. It is also desirable to provide a sheeting that is not susceptible to brightness loss because of overstretching, or because of other deformations in the cube-corner retroreflective layer.

SUMMARY OF THE INVENTION

The present invention provides a flexible retroreflective sheeting that compensates for dimensional changes in the substrate without sacrificing retroreflectivity. The present invention also eliminates any need to rely on stretching the sheeting to a predetermined length to provide optimal retroreflective performance.

In one embodiment, the present invention includes a microstructured member having a body portion and a multitude of cube-corner elements attached to a first side of the body portion, a sealing member, a network of intersecting lines bonding the first side of the body portion and the sealing members together in a regular pattern of cells, and optionally an adhesive. This retroreflective sheeting exhibits a normal state where the microstructured member is curved and is substantially parallel to the sealing member, and a compressed state where the microstructured member is arched and the sealing member is substantially flat.

In summary, the process of making the retroreflective sheeting includes providing a microstructured member having a body portion and a multitude of cube-corner elements projecting from the first side of the body portion, providing a sealing member, conveying these two members at approximately the same speed with the cube-corner elements facing the sealing member, and bonding the first side of the body portion and the sealing member to each other in a regular pattern to form sealed cells each having a curved microstructured member.

In accordance with this invention, the sheeting is useful for accommodating expansions and contractions of traffic control devices without compromising retroreflectivity and without causing wrinkles in the sheeting. Because of its flexible nature, the sheeting is also useful for applications to polymeric surfaces, irregularly shaped surfaces such as a bicycle helmet, and flexible surfaces such as a safety vest.

These figures, which are idealized, are not to scale and are intended merely to be illustrative and non-limiting.

DETAILED DESCRIPTION OF THE INVENTION

The inventive retroreflective sheeting allows for expansion and contraction of the traffic control devices without compromising retroreflectivity, without wrinkling, and without delaminating. The sheeting has a pillowed microstructured member. The term "pillowed" as used herein means the microstructured member has curvature. This pillowing allows the microstructured member to arch to accommodate the contraction of a traffic control element that occurs when the ambient temperature decreases. Conversely, the pillowing allows the microstructured member to flatten to accommodate the expansion of a traffic control device when the ambient temperature increases. Furthermore, the pillowed microstructured member allows for some elongation in the sheeting which aids in its application onto traffic control devices. The overall effect of the invention is to provide a versatile retroreflective sheeting that can accommodate for the differences in expansion and contraction between the device and a sheeting and that is easy to apply onto traffic control devices.

The retroreflective sheeting of the present invention can exhibit normal and stressed states. A "normal" state represents a condition where neither the microstructured member nor the sealing member is in tension or in compression. In a normal state, the microstructured member has curvature and is substantially parallel with the sealing member except where the two are bonded together. The term "parallel" means lines, including curved lines, that are spaced an equal distance apart. The sheeting would typically be in a normal state after fabrication.

A "stressed" state represents a condition where the microstructured member has deviated from its normal state, and is in, for example, a compressed state or an elongated state. A "compressed" state occurs when the microstructured member has arched. An example of a compressed state is where the sheeting contracts in response to a contraction of the underlying substrate. The sheeting compensates for the contraction by compressing and thereby arching the microstructured member. An "elongated" state occurs when the microstructured member has flattened, eliminating almost all curvature. An example of an elongated state is where the sheeting responds to an expansion of the underlying substrate. The sheeting compensates for the expansion by flattening the microstructured member thereby expanding with the substrate. In both stressed states, the sealing member is substantially flat.

I. General Structure of the Sheeting

Figure 1:
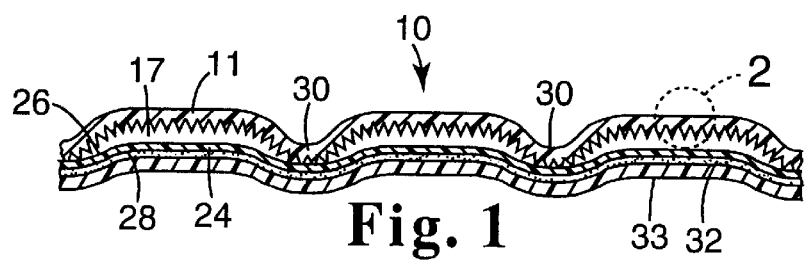
FIG. 1 is a cross-sectional view of a cube-corner retroreflective sheeting in a normal state in accordance with the present invention.

FIG. 1 shows an example of a microstructured retroreflective sheeting 10 of the present invention in a normal state. Retroreflective sheeting 10 comprises a microstructured member 11 bonded to the first side 26 of sealing member 24 through multiple bond lines 30. As seen in FIG. 1, the microstructured and sealing members have similar curvatures and are said to be substantially parallel to each other. The bonding of the two members creates sealed cells 17 containing air. The cells form an array of polygons. Optional adhesive layer 32 with liner 33 may be laminated to the second side 28 of the sealing member 24 to permit the sheeting to be adhered to a surface when the liner has been removed.

Figure 2:
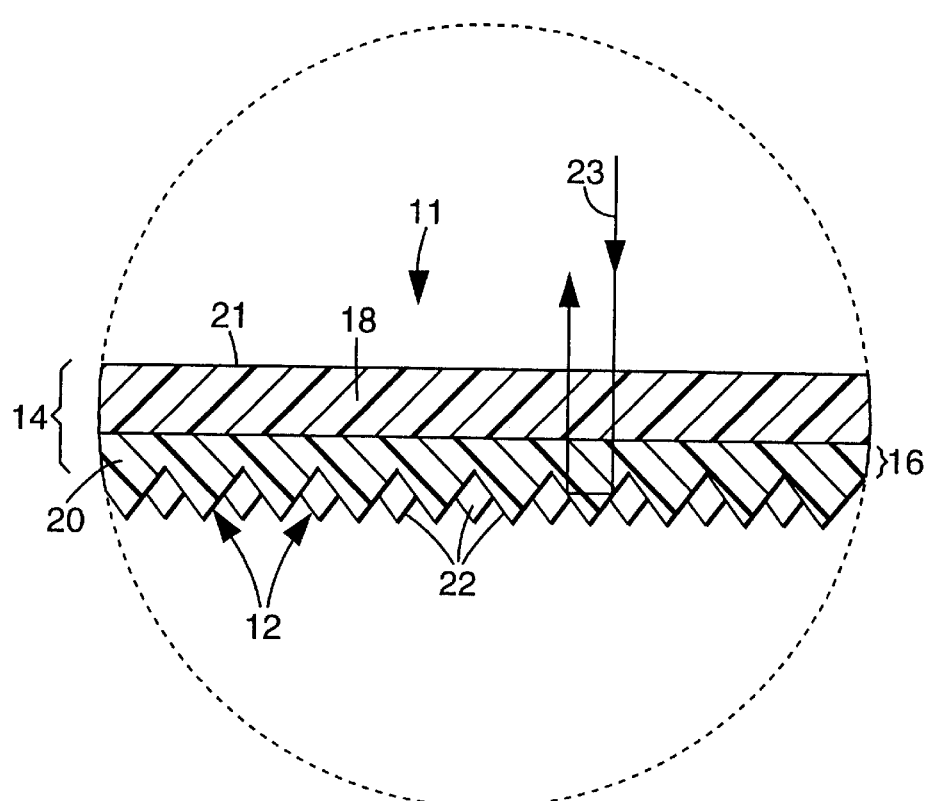
FIG. 2 is a cross-sectional view of a microstructured member.

FIG. 2 shows an example of microstructured member 11, taken at 2 in FIG. 1, comprising a multitude of cube-corner elements 12 and a body portion 14. The body portion 14 can include a land layer 16 and a body layer 18. The cube-corner elements 12 project from a first or rear side 20 of body portion 14. The cube-corner elements 12 and the body layer 18 comprise light transmissible polymeric materials. Light enters the microstructured member 11 through the front surface 21. The light then passes through the body portion 14 and strikes the mutually perpendicular planar faces 22 of the cube-corner elements 12, and returns in the direction from which it came as shown by arrow 23, as is known in the art.

In a preferred construction, the cube-corner elements 12 and land layer 16 are made from similar or the same kind of polymers, and the land layer 16 is kept to a minimal thickness. The land layer 16, typically, has a thickness in the range of about 0 to 150 micrometers, and preferably in the range of approximately about 1 to 100 micrometers. Body layer 18 typically has a thickness of approximately 20 to 1,000 micrometers, and preferably in the range of about 50 to 250 micrometers. The cube-corner elements 12 typically have a height in the range of about 20 to 500 micrometers, and more typically in the range of about 60 to 180 micrometers. Although the embodiment of the invention shown in FIG. 2 has a single body layer 18, it is within the scope of the present invention to provide more than one body layer 18 in the body portion 14.

Figure 3:
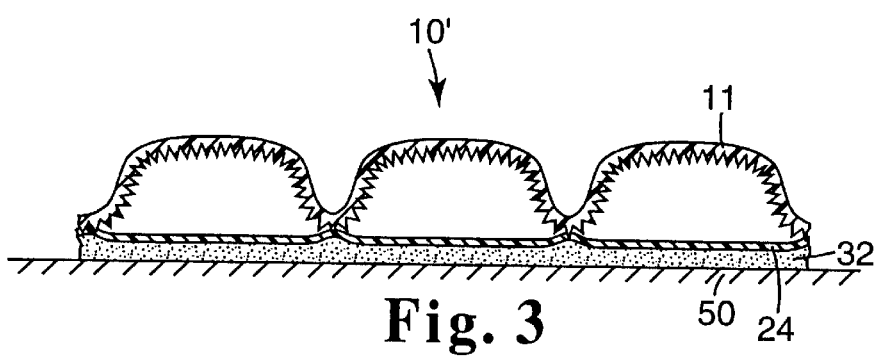
FIG. 3 is a cross-sectional view of a cube-corner retroreflective sheeting in a compressive state.

FIG. 3 shows an example of a microstructured retroreflective sheeting 10' in a stressed state while attached to a traffic control device 50. In particular, the sheeting is in a compressed state wherein the microstructured member has arched in response to a compressive force placed upon it by contraction of the device 50. A temperature decrease is one example of such a stress. When the ambient temperature decreases, the traffic control device contracts. A desirable sheeting must respond to this contraction without wrinkling, delaminating, or lifting off the substrate. It is believed that as a polymeric traffic control device contracts, the sealing member 24 relaxes slightly and the microstructured member 11 arches upward to accommodate this contraction.

The elimination of wrinkles in the sheeting creates several advantages. For example, the retroreflectivity performance of the sheeting is not compromised because there is no significant distortion of the cube-corner elements. Also, the adhesive on the sheeting and the polymeric substrate remain in contact with each other. Because of this contact, dirt and water cannot come between the adhesive and the substrate, which may cause delamination of the sheeting. The microstructured and sealing members are discussed in more detail below.

II. Retroreflective Microstructured Member

The two main elements of the retroreflective microstructured member are the cube-corner formations and the body layer. Both elements include polymers which are light transmissive, meaning that they are able to transmit at least 70 percent of the light incident upon them. Preferably, these polymers transmit greater than 80 percent and more preferably greater than 90 percent of the incident light. Furthermore, the microstructured member maintains good dimensional stability and high degrees of retroreflectance under highly flexed conditions.

The cube-corner formations function as the retroreflective mechanism. There are many cube-corner configurations known in the art, see, for example, U.S. Pat. Nos. 4,938,563 (Nelson et al.), 4,775,219 (Appeldorn), 4,243,618 (Van Arnam), 4,202,600 (Burke et al.), 3,712,706 (Stamm), and 4,588,258 (Hoopman). However in the practice of this invention, the cube-corner configuration described in Hoopman may be preferred because it provides wide angle retroreflection along multiple viewing planes.

The polymeric materials that are used in the cube-corner elements tend to be hard and rigid and may be thermoplastic. Examples of thermoplastic polymers that may be used in the cube-corner elements include acrylic polymers such as poly (methyl methacrylate); polycarbonates; cellulosics; polyesters; polyetherketones; poly(etherimide); polyolefins; poly (styrene) and poly(styrene) copolymers; polysulfone; urethanes including aliphatic and aromatic polyurethanes; and mixtures of the above polymers such as a poly(ester) and poly(carbonate) blend, and a fluoropolymer and acrylic polymer blend.

Additional materials suitable for forming the cube-corner elements are reactive resin systems capable of being crosslinked by a free radical polymerization mechanism by exposure to actinic radiation. Such systems are further described in, for example, U.S. Pat. No. 5,450,235 (Col. 6 lines 34–68; Col. 7, lines 1–48).

The polymeric materials used to make the land layer may be the same as the polymers that are used to make in the cube-corner elements, provided that the land layer is kept to a minimal thickness. In most instances, the land layer is integral with the cube-corner elements. The polymers that are used in the cube-corner elements and land layer can have refractive indices which are different from the body layer. Although the land layer desirably is made of a polymer similar to that of the cubes, the land also may be made from a softer polymer such as those used in the body layer.

The body layer protects the sheeting from the environment, and can provide mechanical integrity to the sheeting. It also gives the sheeting the ability to bend, to curl, or to flex. Preferred polymeric materials used in the body layer are flexible and resistant to degradation by ultraviolet (UV) light radiation so that the retroreflective sheeting can be used for long-term outdoor applications. Examples of polymers that may be used to make the body layer include fluorinated polymers; ionomeric ethylene copolymers; low density polyethylenes; plasticized vinyl halide polymers; polyethylene copolymers; and aliphatic and aromatic polyurethanes. Commercially available polyurethanes include: PN03-214 (from Morton International Inc., Seabrook, N.H.) or X-4107 (from B.F. Goodrich Company, Cleveland, Ohio).

Combinations of the above polymers also may be used to make the body layer of the body portion. Preferred polymers for the body layer include: ethylene copolymers that contain units that contain carboxyl groups or esters of carboxylic acids such as poly(ethylene-co-acrylic acid), poly(ethylene-co-methacrylic acid), poly(ethylene-co-vinylacetate); ionomeric ethylene copolymers; plasticized poly(vinylchloride); and aliphatic urethanes. These polymers are preferred for one or more of the following reasons: suitable mechanical properties, good adhesion to the land layer, clarity, and environmental stability.

Colorants, UV absorbers, light stabilizers, free radical scavengers or antioxidants, processing aids such as antiblocking agents, releasing agents, lubricants, and other additives may be added to the body portion or cube-corner elements. These components are known in the art, and are further described in, for example, U.S. Pat. No. 5,450,235 (Col. 9, lines 46–68 and Col. 10, lines 1–14).

III. Sealing Member

In FIG. 1, the microstructured retroreflective sheeting 10 of the present invention also includes a sealing member 24. The sealing member functions to provide a mechanism to form sealed cells 17 and to protect the cube-corner elements 12.

Examples of polymers that may be used in the sealing member include polyurethanes, polyethylene terephthalate, polyethylene copolymer, alkylene/alkyl acrylate copolymers such as ethylene/methyl acrylate copolymer, ethylene/N-butyl acrylate copolymer, ethylene/ethyl acrylate copolymer, ethylene/vinyl acetate copolymers, polymerically plasticized polyvinyl chloride (PVC), and polyurethane primed ethylene/acrylic acid (EAA) copolymer. The term "polyurethane" typically includes polymers having urethane and/or urea linkages and such is the intended meaning herein. Also, polyurethane includes polyether polyurethanes, polyester polyurethanes, and polycarbonate polyurethanes. Blends of such materials may be used if desired.

An example of a suitable EAA material for use in the invention is PRIMACOR™ 3440 (from Dow Chemical Co., Midland, Mich.). It is a copolymer of ethylene and acrylic acid, the latter present at about 9 weight percent of the total weight of ethylene and acrylic acid monomer; the copolymer has a melt index of about 10.

Polymerically plasticized PVC is considered a distinctly different material from monomericly plasticized PVC because plasticizers from the former will not migrate from PVC. Polymerically plasticized PVC will remain flexible and will not cause deterioration in the optical performance of the retroreflective member.

Preferred polymers for the sealing member include polyether polyurethanes, polyester polyurethanes, polycarbonate polyurethanes, all of which may be aliphatic or aromatic. Also, blends of these may be used. A suitable blend comprises between approximately 50 and 99 weight percent aliphatic polyester polyurethane with between approximately 1 and 50 weight percent of a pigmented aromatic polyether polyurethane. One example of suitable blend comprises 60 weight percent of the aliphatic polyester polyurethane known as MORTHANE™ PNO3-214 (from Morton International, Seabrook, N.H.) with 40 weight percent of a pigmented aromatic polyether polyurethane. The pigmented aromatic polyether polyurethane further comprises 50 weight percent aromatic polyurethane known as ESTANE™ 58810 (from B.F. Goodrich Co., Cleveland, Ohio) and 50 weight percent titanium dioxide, previously compounded by suitable means, such as in a twin screw extruder and subsequently pelletized. Another example of a suitable polyurethane may be prepared by twin screw compounding between approximately 1 and 50 weight percent of titanium dioxide directly into an aliphatic polyurethane such as MORTHANE™ PNO3-214. These polymers are preferred for one or more of the following reasons: suitable mechanical properties, environmental stability, ease of processing, and good adhesion to the microstructured member. Suitable thicknesses for the sealing member is between approximately 25 and 200 micrometers and preferably in the range between approximately 50 and 130 micrometers.

III. Methods of Manufacturing

Retroreflective sheetings of the present invention can be made by providing a microstructured retroreflective member having a body portion and a plurality of cube-corner elements projecting from a first side of the body portion; providing a sealing member; conveying the microstructured member and the sealing member at approximately the speed; and bonding the first side of the body portion and the sealing member to each other in a regular pattern to form sealed cells each having a curved microstructure member. The microstructured and sealing members may be bonded by thermal or ultrasonic means.

In a thermal bonding process, thermal energy and pressure are used to bond the microstructured and sealing members together. Typically, one member is placed against a steel roll while the other member is placed against a rubber roll. The steel roll, referred to as the "embossing roll," has a raised ridge embossing pattern on its surface. The embossing roll is usually heated to enhance the bond between the two members. The temperature at which the embossing roll is heated to depends on which member it contacts, and can range from between approximately 193° C. and 260° C. (380° F. to 500° F.). Preferably, the temperature range is from between approximately 204° C. and 243° C. (400° F. to 470° F.). The embossing roll and the rubber roll are allowed to come together with the rubber roll exerting pressure against the embossing roll. The pressures commonly used range from between approximately 34 and 136 N/cm (20 to 80 lb$_f$/in). The raised ridges bond the two members along a plurality of intersecting bond lines.

Figure 4:
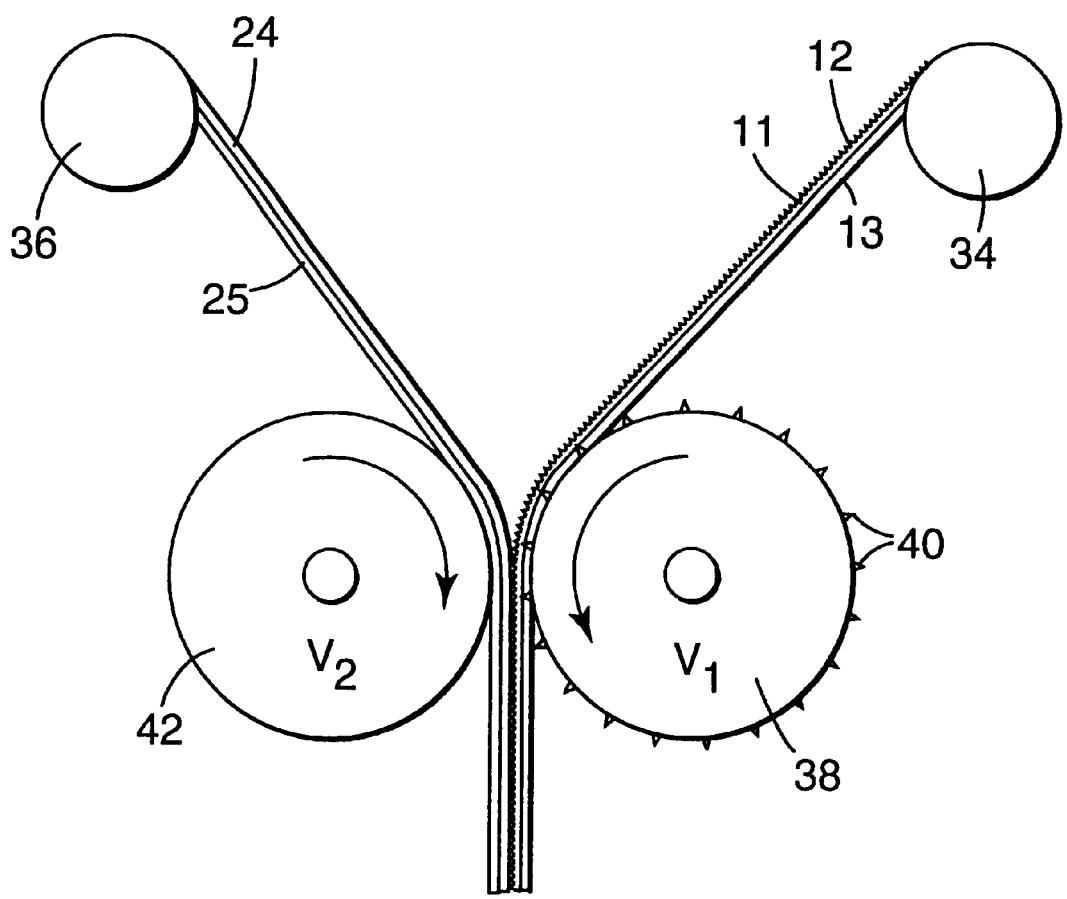
FIG. 4 is a schematic representation of a bonding process for making the sheeting of the present invention.

FIG. 4 shows a schematic representation of a thermal bonding process used to produce a preferred embodiment. Microstructured member 11 with its cube-corner elements 12 exposed is unwound from roll 34. Sealing member 24 is unwound from roll 36. Typically, microstructured member 11 is covered with a protective film 13 which is allowed to contact the embossing roll 38 turning at a surface velocity of $V_1$. Likewise, sealing member 24 is covered with a protective film 25 which is allowed to contact the rubber roll 42 turning at a surface velocity of $V_2$. Velocities $V_1$ and $V_2$ are approximately the same. Bonding between the two members occur at raised ridges 40 to form sealed cells. In these cells, there is typically air between the microstructured and sealing members.

The preferred thermal bonding process described in FIG. 4 is referred to as "front face" bonding, because the embossing roll contacts the front, or microstructured side of the article. As a result of front face bonding, the microstructured member of each cell has curvature and is said to be pillowed. In contrast, if the placement of the members are reversed so that the sealing member contacts the heated embossing roll, the process is referred to as "back face" bonding.

Alternatively, ultrasonic energy may be used in place of thermal energy. However, the embossing roll would not be heated and the rubber roll would be replaced with a suitable means for supplying ultrasonic energy, such as an ultrasonic horn and a power supply.

In either bonding processes, the microstructured member and sealing member are bonded along bond lines that form a regular array of polygons. A suitable polygon allows the microstructured member to grow in curvature or to flatten as a response to a dimensional change of the traffic control devices. Preferred polygons include parallelograms, such as rectangles or squares. The length of the rectangles can range between approximately 5 and 150 mm (0.2 to 6 in); the width of the rectangles can range from between approximately 5 and 25 mm (0.2 to 1 in). The width is taken to be the longitudinal direction of the sheeting. In one preferred embodiment, the retroreflective sheeting is bonded in a repeating rectangular pattern of 12.7 mm by 8.6 mm (0.50× 0.34 in).

An adhesive may be laminated to one side of the sealing member. Those skilled in the art will recognize that care must be taken in selecting an adhesive that will adequately adhere to polymeric traffic control devices because of their low surface energies. Suitable adhesive may be distinguished by acceptably high shear strength, by acceptably high peel adhesion, and by resistance to delamination after an appropriate water soak test. One suitable adhesive is a tackified synthetic rubber based pressure sensitive adhesive.

After the retroreflective sheeting is fabricated, it can be applied to polymeric traffic control devices, such as barrels, cones or tubes. A wide variety of polymers may be used to fabricate traffic control devices. Preferably, the traffic control devices will be selected from a group of polymers that have a coefficient of linear thermal expansion in the range of approximately $100 \times 10^{-6}$ m/mK to $250 \times 10^{-6}$ m/mK at 20° C. Furthermore, the ratio of the coefficient of linear thermal expansion between the traffic control device and the retroreflective sheeting is at least 1.5:1 and no greater than 6:1. Preferred polymers for traffic control elements include low density polyethylene, high density polyethylene, polypropylene, plasticized polyvinyl chloride, and their copolymers.

The sheeting may be applied to traffic control devices manually or through mechanical means as disclosed in U.S. Pat. No. 5,047,107 (Keller et al.). In a manual application, tension is placed on the sheeting as it is being applied to the devices. An advantage of the present invention is that because of the pillowed microstructure member, the sheeting can exhibit some elongation, typically less than 3% with minimal cube-corner distortions. This elongation is enough to allow the sheeting to be guided in a straight line on a traffic control device thereby further enhancing ease of manual application. Because the elongation comes from flattening the pillowed microstructured member, there is minimal cube-corner distortions and thus minimal reduction in brightness.

In another embodiment of the present invention, pillowed sheeting may be provided as follows. Instead of using a microstructured member and separate sealing member and simultaneously bonding together and pillowing the two layers, sealed sheeting may be pillowed by deforming the sheeting in a separate process. The term "sealed sheeting" means that the sealing member has been previously bonded to the microstructured member (preferably with a network of bond lines that form individual cells) to form retroreflective sheeting. Thus, the sealed sheeting is pillowed in a separate process, which may or may not provide bonding. The sealed sheeting could be pillowed immediately after it is formed (so that any residual heat in the sheeting aids in forming the pillows) or at any later time. Alternatively, the sheeting could be pillowed as described elsewhere herein and then subsequently bonded in a network of bond lines to form individual cells.

Standard microstructured retroreflective sheeting, such as the cube-corner retroreflective sheeting of the type available from Minnesota Mining and Manufacturing Company of St. Paul, Minn. (3M) under the designation FLEXIBLE DIAMOND GRADE™, may be pillowed by passing the sheeting through a nip between a patterned roll and a backing roll. The patterned roll is preferably steel, and the backing roll preferably rubber. The sheeting is preferably passed through the nip with the microstructured member facing the patterned roll, and may be done at any suitable temperature and pressure. Room temperature is preferred, as is pillowing at the lowest effective pressure, for simplicity and cost-effectiveness.

The pillowing process, when applied to sealed sheeting, provides certain benefits. As noted elsewhere, pillowed sheeting can expand and contract responsive to changes in ambient temperature, and may be "steered" or directed more effectively when applied to a surface, such as the surface of a traffic barrel. In addition, sheeting that has been sealed in a network or pattern of individual cells is less susceptible to optical and structural deterioration if the sheeting is cut or ripped, because the dirt or water that enters the damages cells cannot migrate beyond those cells. If FLEXIBLE DIAMOND GRADE™ cube-corner retroreflective sheeting is used, the seal pattern is sufficiently small that a damaged cell, such as one that has dirt or water in it and therefore does not retroreflect light effectively, is not very noticeable to an ordinary observer. Another benefit is that pillowing sealed sheeting can be done very inexpensively, because the nip arrangement (or other suitable arrangement) used for pillowing can be inexpensively set up. The pillowed sheeting made in accordance with this embodiment can be used on any suitable substrate or traffic control device, as with the sheetings described elsewhere herein.

IV. Examples

The following examples illustrate different embodiments of the invention. However, the particular ingredients and amounts used as well as other conditions and details are not to be construed in a manner that would limit the scope of this invention. All percentages are by weight, unless otherwise stated.

Example 1 (Comparative)

A retroreflective microstructured member was produced as follows. Molten polycarbonate resin (MARKLON™ 2407 from Mobay Corporation, Pittsburgh, Pa.) was cast onto a heated microstructured nickel tooling containing microcube prism recesses having a depth of about 86 micrometer (0.034 in). These recesses were formed as matched pairs of cube-corner elements with the optical axis canted or tilted 8.15 degrees away from the primary groove, as generally described in U.S. Pat. No. 4,588,258 (Hoopman). The nickel tooling thickness was 508 micrometers (0.02 in) and it was heated to 215.6° C. (420° F.). The molten polycarbonate, at a temperature of 287.8° C. (550° F.), was cast onto the nickel tool at a pressure of about $1.03 \times 10^7$ to $1.38 \times 10^8$ Pascals (1500 to 2000 psi) for about 0.7 seconds to replicate the microcube recesses. Simultaneously with filling the cube recesses, additional polycarbonate was deposited in a continuous land layer above the tooling with a thickness of about 86 micrometers (0.0034 in). A previously-extruded 64 micrometer (0.025 in) thick aliphatic polyester urethane (MORTHANE PNO3-214 from Morton International, Seabrook, N.H.) film was laminated onto the top surface of the continuous polycarbonate land when the surface temperature of the land was about 190° C. (375° F.). This aliphatic polyester urethane was protected by a 61 micrometers (0.024 in) thick polyester terephthalate (PET) film. The nickel tooling, along with the polycarbonate and laminated polyurethane, was cooled with room temperature air for about 18 seconds to a temperature between 71° C. and 88° C. (160° F. and 190° F.), allowing the laminate material to solidify to form the microstructured member. This member, having a substantially flat first side and a multitude of cube-corners on the second side, was then removed from the nickel tooling.

A sealing member was produced as follows. A blend of 60% aliphatic polyester urethane (MORTHANE™ PNO3-214) and 40% aromatic polyester polyurethane (including 50% aromatic polyester urethane, ESTANE™ 58810 from B.F. Goodrich Co., Cleveland, Ohio and 50% titanium dioxide, previously compounded in a twin screw extruder and pellitized) was extruded. One side of the sealing member was protected by a 51 micrometers (0.002 in) thick PET film.

Subsequently, the microstructured and sealing members were fed into a nip at approximately the same speed between a steel embossing roll and a rubber roll having a 75 Shore A durometer. The embossing pattern on the steel roll was of rectangular configuration with dimensions of 0.86 cm by 2.54 cm (0.34×1 in).

The PET film of the microstructured member was allowed to contact the rubber roll with the cube-cornered side exposed. The PET film of the sealing member was allowed to contact the steel embossing roll with the sealing member exposed (i.e. back face bonding). The steel embossing roll was heated to 216° C. (420° F.). The rolls turned at a speed of 1.52 meters/min (5 feet/min) and the force on the nip was held at 43 N/cm (25 lb/in). As the members passed through the nip, bonds were created between the exposed sealing member and the cube-corners of the microstructured member. Both PET protective films were then removed. A previously coated 63 micrometer (0.0025 in) thick tackified synthetic rubber based pressure sensitive adhesive was laminated to the unbonded side of the sealing member.

The resultant retroreflective sheeting had a substantially smooth microstructured top surface. This sheeting was applied manually onto traffic control device such as a barrel as generally described in U.S. Pat. No. 5,026,204 (Kulp et al.). The low density polyethylene barrels (from Traffix Devices Inc., San Clemente, Calif.) are about 4 feet tall and had 5 tapered rings each slightly larger than the next and is molded as one piece. The base of the barrel was molded separately.

The barrels were placed onto a mandrel rotating at 1.52 meters/min (0.5 revolutions/min). They were heated to a surface temperature of 49° C. (120° F.). This heating simulated operating conditions used by some manufacturers who apply retroreflective sheeting after flame-treating the barrels. Immediately after the heating, the sheetings were applied manually to the barrels.

As the barrels cooled to room temperature of about 21° C. (70° F.), the sheeting lifted off the barrel. It is believed that because the sheeting had a smooth microstructured member, one way for the sheeting to respond to the barrel contracting was buckling and lifting off the substrate thereby forming wrinkles.

Consequently, rain and dirt can accumulate behind these wrinkled areas and promote them causing a reduction in brightness. As the wrinkles get promoted, there may be regions where the sheeting delaminates from the barrels.

Example 2

The microstructured and sealing members were made in accordance with Example 1 except as described below.

The PET film of the microstructured member was allowed to contact the steel emboss roll with the cube-cornered side exposed (front face bonding). The PET film of the sealing member was allowed to contact the rubber roll with the sealing member exposed as shown in FIG. 4. The steel embossing roll was heated to 243° C. (470° F.). The rolls turned at a speed of 1.52 meters/min (5 feet/min) and the force on the nip was held at 86 N/cm (50 lb/in) to create bonds between the cube-corners and the exposed sealing member. Both PET films were then removed. A previously coated 63 micrometer (0.0025 in) thick tackified synthetic rubber based pressure sensitive adhesive was laminated to the unbonded side of the sealing member.

The resultant retroreflective sheeting had a substantially pillowed or curved microstructured member. The sheeting was laminated to a barrel as generally described in Example 2. As the barrels cooled to room temperature of about 21° C. (70° F.), the sheeting remained secured to the barrel. It is believed that the pillows changed their shaped and arched to accommodate for the contraction of the barrel.

Measurements of the dimensions of the pillows were made to determine the growth in curvature. The two dimensions measured included the height of the pillows and the base of the pillows. The base is taken to be the length one side of the rectangle. The height represented the distance from the midpoint of the base to the top of the microstructured member.

TABLE 1

| Sheeting State | Height (cm) | Base (cm) | Ratio (H to B) |
|---|---|---|---|
| normal | 0.051 | 1.27 | 0.040 |
| compressed | 0.11 | 1.26 | 0.081 |

Referring to Table 1, the "normal" state referred to a sheeting of this example after adhesive lamination; the "compressed" state referred to the sheeting applied on a barrel that had seen a temperature change from 49° C. to 4° C. (120° F. to 40° F.). As Table 1 shows, the height to base ratio approximately doubled as the sheeting changed from a normal to a compressed state in response to the contraction of the barrel resulting from the temperature decrease.

Example 3

Sealed FLEXIBLE DIAMOND GRADE™ cube-corner retroreflective sheeting was provided, and included an adhesive layer applied to the sealing member, and a polymeric liner applied over the adhesive. The sheeting was run through a nip arrangement that had a rubber roll and a patterned steel roll. The steel roll had a series of raised ridges that ran parallel and perpendicular to the longitudinal axis of the roll. The raised ridges were approximately 0.1 cm (0.040 inches) high, and formed an array of rectangles measuring approximately 0.86 cm by 2.54 cm (0.340 inches by 1.0 inches). The sheeting was run through the nip with the sealing member against the rubber roll and with the microstructured member nearest the steel embossing roll. The sheeting was embossed or pillowed at room temperature and with a nip pressure of about 10.75 kg per lineal centimeter width (60 pounds per lineal inch width). A satisfactory pillowed sheeting was produced.

This invention may take on various modifications and alterations without departing from the spirit and scope thereof. Accordingly, it is to be understood that this invention is not to be limited to the above-described but is to be controlled by the limitations set forth in the following claims and any equivalents thereof.

I claim:

1. A method of making a pillowed retroreflective article comprising the steps of:
   (a) providing a sealed retroreflective sheeting, the sheeting comprising a retroreflective member and a sealing member bonded together along a network of bond lines; and
   (b) pillowing the sealed sheeting along a set of lines, at least some of which do not correspond to the bond lines.

2. The method of claim 1, wherein step (b) comprises passing the sealed sheeting between two rollers, one of which has raised ridges for embossing pillows into the sheeting.

3. The method of claim 2, wherein the raised ridges are approximately 0.1 cm high.

4. The method of claim 2, wherein the raised ridges form an array of rectangles.

5. The method of claim 4, wherein the rectangles have sides measuring less than 2.54 cm.

6. The method of claim 2, wherein the pressure between the rollers is approximately 11 kg per lineal cm.

7. The method of claim 1, wherein step (b) further comprises bonding the retroreflective member and the sealing member together along lines that form pillows.

8. The method of claim 1, wherein step (b) is done at room temperature.

9. The method of claim 1, wherein step (b) comprises pillowing the retroreflective surface of the sheeting.

10. The method of claim 1, wherein step (b) comprises pillowing the sealing member of the sheeting.

* * * * *